Patented May 4, 1943

2,318,120

UNITED STATES PATENT OFFICE 2,318,120

TREATMENT OF TEXTILE YARNS AND FILAMENTS

William Whitehead, Rye, N. Y., assignor to Celanese Corporation of America, a corporation of Delaware No Drawing. Application July 26, 1940, Serial No. 347,794

4 Claims. (Cl. 28—76)

This invention relates to the treatment of textile yarns, filaments and the like made of cellulosic materials, particularly those made of or containing cotton or regenerated cellulose, in order to improve their properties.

An object of the invention is the treatment of cellulosic yarns or filaments in order to improve their wearing properties.

Another object of this invention is the treatment of yarns or filaments made of or containing cotton or regenerated cellulose so as to render them more suitable in the use of coated material.

A further object of this invention is the production of improved tire cords adapted to be embedded in rubber to form tire fabrics, suitable for use in the production of tires for automobiles and other vehicles, from yarns or filaments of cotton or regenerated cellulose superficially esterified with phthalic anhydride, which for the purpose of this specification is included under the term "regenerated cellulose."

Other objects and advantages of this invention will appear from the following detailed description.

While this invention is applicable to the production of various plastic coated fabrics wherein the plastic is plasticized cellulose acetate or other derivative of cellulose, resin or rubber, suitable for use in the production of imitation leather, balloon cloth, tire fabrics and the like, it finds its most advantageous use in the production of tire fabrics employed in building rubber tires.

Heretofore tire cords of cotton or regenerated cellulose were not satisfactory due to the nature of the surface of such materials resulting in a development of heat at the interface of the rubber and the tire cords making for poor adhesion. Another factor which lessened the desirability of cotton or regenerated cellulose tire cords is that the presence of air spaces between the yarns of the tire cords prevented the production of tire fabric wherein there was complete and unbroken union between the rubber and the cords embedded therein.

I have now found that the foregoing difficulties may be overcome and superior tire cords produced by forming the tire cords from yarn made by blending yarns, filaments or fibers of a coalescible material with yarns, filaments or fibers of cotton or regenerated cellulose, and treating the resultant yarn so as to cause the components thereof to adhere to each other on at least the surface of the yarn. Preferably the tire cord yarns are prepared by adding filaments or fibers of an organic derivative of cellulose to filaments or fibers of cotton or regenerated cellulose and spinning and/or twisting them together to form the yarn. A number of such yarns are then plied together to form a tire cord of required denier. After the formation of the tire cords, either before or after they are formed into a fabric, they are subjected to a treatment adapted to effect at least a partial coalescence of the organic derivative of cellulose component thereof. Advantageous results are obtained when the proportion of organic derivative of cellulose filaments or fibers present in the tire cord yarn is from ½ to 10% based on the weight of the yarn.

In accordance with my invention tire cords are prepared by spinning a mixture of filaments or fibers of cotton or regenerated cellulose and filaments or fibers of an organic derivative of cellulose which may or may not contain a plasticizer into a yarn having a 23/1 count and approximately 20 turns per inch. Five ends of this 23/1 yarn are plied together and three ends of the five-ply yarn are plied into one end, thus producing a tire cord of approximately 3,000 denier. At this point the yarns may be subjected to the action of a solvent or solvent vapors, or a desired number of them may first be arranged in parallel relationship to form a warp sheet, with or without a weft, and then subjected to the action of a solvent or solvent vapor. The warp sheet of treated tire cords are passed through a calender where they are coated with rubber to form a tire fabric. Heretofore it was found necessary to coat the tire cords with latex or similarly acting materials before passing them through the calender. However, by preparing the tire cords in accordance with my process, this step is no longer necessary. The tire fabric produced from the tire cords made in accordance with the present process have greater strength in resisting distortion than prior tire fabrics, since there is complete union between the tire cords and the rubber with no air spaces or blisters therebetween.

Coalescence of the organic derivative of cellulose filaments or fibers in the tire cord yarns may be effected by subjecting them to the action of a solvent for the organic derivatives of cellulose, solvent vapor or, since the organic derivatives of cellulose are thermoplastic in character, to the action of heat. This treatment lays the filament or fiber ends projecting from the yarn surface and effects a reduction in the amount of mechanically entrapped air in the yarn, resulting in a product which, when made into a tire cord and embedded in rubber to form tire fabric, is found to have no air spaces or blisters effecting a separation at the interface between the tire cords and rubber.

The yarns employed to produce the tire cords in accordance with my invention may be made in any suitable manner. Preferably, however, they are made by spinning a mixture of staple length regenerated cellulose fibers and staple length organic derivative of cellulose fibers, the amount of the organic derivative of cellulose fibers present in the yarn being from 1 to 10% on the weight of the yarn.

The regenerated cellulose filaments or yarns, from which the staple lengths are made, are formed by regenerating cellulose from any cellulose derivative capable of being converted to cellulose. Examples of such cellulose derivatives are cellulose nitrate, cuprammonium cellulose, cellulose acetate, cellulose propionate and cellulose butyrate. Advantageously, the regenerated cellulose filaments or yarns are formed by stretching filaments or yarns of cellulose acetate up to 200 to 500% of their original length and then completely saponifying the stretched products. Such regenerated cellulose filaments or yarns are of increased tenacity and make highly satisfactory tire cords.

Any suitable organic derivative of cellulose may be employed as the base material of the coalescible filaments or fibers, such as cellulose esters or cellulose ethers. Examples of cellulose esters are cellulose acetate, cellulose propionate and cellulose butyrate while examples of cellulose ethers are ethyl cellulose and benzyl cellulose.

While I prefer to use acetone or acetone vapors as the coalescing medium to be applied to the yarns of the tire cord, other solvents or restricted solvents for the organic derivative of cellulose may of course be employed. Examples of such other solvents or solvent mixtures are ethylene dichloride and ethyl or methyl alcohol, dichlorethylene and ethyl or methyl alcohol, etc. The yarns, threads or fabric may be passed through nip rollers or other pressing machine during the coalescing action. In this event it is preferable to use a combination of solvent or solvent vapor and heat.

The coalescible filaments or fibers may be completely destroyed or only those filaments or fibers that lie near the surface may be effected during the coalescing action leaving the filaments or fibers at the center substantially unaffected. It is preferable to so regulate the percentage of coalescible fiber employed or the extent of the coalescing action such that there is relatively no stiffening of the yarn. For instance, the larger amount of organic derivative of cellulose fiber employed the less severe should be the coalescing treatment and vice versa. I have found that the action should be just sufficient to lay the projecting fibers, which action may be aided by passing the yarns, threads or fabric between nip rollers during the coalescing treatment.

Often it is advantageous to have present in the organic derivative of cellulose filaments or fibers plasticizers such as triacetin, diacetin, dibutyl tartrate, tricresyl phosphate and the like. Where cellulose acetate is employed as the base of the filaments or fibers to be associated with the regenerated cellulose filaments or fibers, satisfactory results are obtained by incorporating a small amount, say, from 1 to 5% based on the weight of the yarn, of tricresyl phosphate.

In order further to illustrate my invention but without being limited thereto, the following specific example is given:

*Example*

Yarns are formed by spinning a mixture of staple length regenerated cellulose fibers in a proportion of 95% by weight of the yarn and about 5% by weight of staple length cellulose acetate fiber, the finished yarns having a 23/1 count and a twist of approximately 20 turns per inch. Five ends of the yarn are plied together and three ends of the five-ply yarn are plied into one end producing a tire cord having a denier of approximately 3,000. A plurality of these yarns are then warped while subjecting them to acetone vapors and then sufficient heat is applied to said yarns to remove the acetone. The solvent action of the acetone lays the projecting fibers, partially coalesces the filament of the yarns and also binds the yarns into a tire cord. The warp is then passed through a calender where rubber is applied thereto to form a tire fabric. This tire fabric is resistant to distortion and there is complete union between the yarns and the rubber with no air spaces or blisters effecting a separation of the interface.

It is to be understood that the foregoing detailed description is given merely by way of illustration and that many variations may be made therein without departing from the spirit of my invention.

Having described my invention, what I desire to secure by Letters Patent is:

1. In a process for the manufacture of tire fabric, the steps of forming tire cords from yarns comprising a mixture of cellulosic filaments or fibers and organic derivative of cellulose filaments or fibers, the latter being present in an amount of ½ to 10% of the weight of the cord, arranging the tire cords in parallel relation to form a fabric and subjecting said fabric to the action of a solvent medium so as to cause the organic derivative of cellulose filaments or fibers to coalesce on at least the surface of the tire cords.

2. In a process for the manufacture of tire fabric, the steps of forming tire cords from yarns comprising a mixture of regenerated cellulose filaments or fibers and organic derivative of cellulose filaments or fibers, the latter being present in an amount of ½ to 10% of the weight of the cord, arranging the tire cords in parallel relation to form a fabric and subjecting said fabric to the action of a solvent medium so as to cause the organic derivative of cellulose filaments or fibers to coalesce on at least the surface of the tire cords.

3. In a process for the manufacture of tire fabric, the steps of forming tire cords from yarns comprising a mixture of regenerated cellulose filaments or fibers and cellulose acetate filaments or fibers, the latter being present in an amount of ½ to 10% of the weight of the cord, arranging the tire cords in parallel relation to form a fabric and subjecting said fabric to the action of acetone so as to cause the cellulose acetate filaments or fibers to coalesce on at least the surface of the tire cords.

4. In a process for the manufacture of tire fabric, the steps of forming tire cords from yarns comprising a mixture of staple length regenerated cellulose filaments or fibers and staple length cellulose acetate filaments or fibers, the latter being present in an amount of ½ to 10% of the weight of the cord, arranging the tire cords in parallel relation to form a fabric and subjecting said fabric to the action of acetone vapor so as to cause the cellulose acetate filaments or fibers to coalesce on at least the surface of the tire cords.

WILLIAM WHITEHEAD.

CERTIFICATE OF CORRECTION.

Patent No. 2,318,120.  May 4, 1943.

WILLIAM WHITEHEAD.

It is hereby certified that error appears in the printed specification of the above numbered patent requiring correction as follows: Page 2, second column, lines 33, 45, 56 and 68, claims 1 to 4 inclusive, for the word "fabric" read --warp sheet--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.